United States Patent [19]
Dostert et al.

[11] Patent Number: 5,997,038
[45] Date of Patent: Dec. 7, 1999

[54] VEHICLE SUSPENSION AND STEERING CRADLE

[75] Inventors: Kenneth W. Dostert, Clinton Township; Robert D. Campbell, Royal Oak; David L. Hoelscher, Troy, all of Mich.

[73] Assignee: Chrysler Corporation, Auburn Hills, Mich.

[21] Appl. No.: 09/203,646

[22] Filed: Dec. 1, 1998

Related U.S. Application Data

[63] Continuation of application No. 08/574,885, Dec. 19, 1995, Pat. No. 5,879,026.

[51] Int. Cl.[6] .................................................. B62D 21/02
[52] U.S. Cl. .......................... 280/781; 180/312; 280/785
[58] Field of Search ..................................... 280/785, 781, 280/790, 124.109, 124.1; 180/311, 312

[56] References Cited

U.S. PATENT DOCUMENTS 3,856,323  12/1974  Arning et al. .
5,879,026   3/1999  Dostert et sl. .

OTHER PUBLICATIONS

Talon Service Manual, Chrysler Corporation, 1994, 2A–11, 19S–19.

*Primary Examiner*—Eric Culbreth

[57] ABSTRACT

A front suspension and steering mount cradle is disclosed for front-wheel-drive and all-wheel drive motor vehicles which provides improved component packaging, noise isolation, and heat shielding. The cradle includes laterally spaced apart supporting end arches integrally joined by a transversely extending inverted U-section saddle, wherein each arch is defined by an upper section terminating in downwardly diverging front and rear legs. Each front leg ends in a pivot pin fitting for connection to a suspension arm front pivot bushing while each rear leg terminates in a footpad housing connection for a rear bushing fitted on a rearward extending stem of each arm. Each cradle forward leg provides a pedestal bracket for supporting a frame front isolator assembly while each rear footpad supports a frame rear isolator assembly. A pair of upstanding engine mounting flanges on the saddle bight wall insure exact powertrain orientation. Inner surfaces of the cradle walls are formed with fastener bosses for readily mounting steering gear and anti-sway bar assemblies in a manner whereby the cradle shields the assemblies from engine catalytic converter heat, impingement from stones, and the like.

17 Claims, 9 Drawing Sheets

VEHICLE SUSPENSION AND STEERING CRADLE

This application is a continuation of U.S. patent application Ser. No. 08/574,885, filed Dec. 19, 1995, now U.S. Pat. No. 5,879,026, issued Mar. 9, 1999.

FIELD OF THE INVENTION

This invention relates to vehicle front end supporting structures and, more particularly to a subframe cradle which performs support and compact packaging functions for front-wheel and all-wheel-drive vehicles suspension, steering, and powertrain components.

BACKGROUND OF THE INVENTION

It is known in the art relating to powertrain and front suspension mounting arrangements for front-wheel-drive vehicles to provide a rigid subframe cradle, separate from the vehicle body, to support such arrangements. In U.S. Pat. No. 4,240,517, issued Dec. 23, 1980, to Harlow, Jr. et al., a front-wheel-drive vehicle is shown having a powertrain with a transversely positioned engine and transmission together with independent front wheel suspensions each with a control arm. The Harlow patent discloses a cradle to which the control arms are swingably mounted while a plurality of cushion mounts support the cradle at high impedance points on the vehicle body.

U.S. Pat. No. 5,375,870, issued Dec. 27, 1994 to Smith et al., discloses a mounting structure for a vehicle front engine and an operatively interconnected transmission mounted on a subframe cradle. The Smith cradle also supports each front wheel suspension system lower control arm by means of its pair of legs adapted to be pivotally connected at their ends to a side of the cradle.

SUMMARY OF THE INVENTION

It is a feature of the present invention to provide a unitary subframe mounting cradle for front wheel drive vehicles to which a plurality of components, including front wheel suspension, steering, and powertrain assemblies, are readily mounted in a compact non-interfering manner.

It is another feature of the present invention to provide a vehicle unitary sub-frame cradle which allows a vertical stacking structural arrangement for the front suspension lower control arms, anti-sway bar, steering gear assembly, and powertrain while achieving improved noise isolation.

It is still another feature of the present invention to provide a vehicle subframe front suspension and powertrain mounting cradle which allows for commonality of front suspension and powertrain components between optional front-wheel-drive or all-wheel-drive vehicles, wherein the cradle is adapted to support either a right hand or a left hand drive system.

It is still a further feature of the present invention to provide a vehicle subframe front suspension and powertrain supporting cradle including a pair of outboard arches joined by a transversely extending, inverted U-section saddle defining a top bight wall joining downstanding front and rear walls. The underside of the bight wall is formed with integral fastener bosses for connecting a plurality of brackets adapted for readily mounting a front wheel drive steering assembly whereby the cradle shields the steering assembly against engine catalytic converter heat, damage from road stone impingement, and the like.

It is yet another feature of the present invention to provide an arrangement for readily mounting the cradle on body frame side rails by four substantially identical isolator assemblies, wherein each isolator assembly includes upper and lower interlocking cushion mounts, thereby reducing the transmission of road noise to the passenger compartment. The cradle includes a pair of integrally cast front pedestal isolator support brackets and a pair of rear isolator support footpads each provided with an aperture conforming with an upstanding collar of its associated lower cushion mount. The four lower cushion mount collars are inserted from below, in a press-fit manner, in their associated cradle apertures prior to transporting each cradle sub-assembly to a vehicle assembly plant.

An additional feature of the cradle final assembly operation is that each upper cushion mount has an axial blind passage telescopically received on an upper end of a lower mount central pillar, thereby initially joining the mounts in an un-compressed free state. After each cradle outboard arch is positioned on the underside of an associated vehicle frame side rail, an isolator attachment bolt, inserted from below through aligned holes in a lower mount base and an upper mount cap, is threaded in a side rail weld nut. Upon each bolt being tightened, its associated cushion mounts are compressed causing each lower mount pillar upper end to receive a key formed in its upper mount cap at the passage blind end, thereby positively interlocking each pair of isolator mounts against relative rotation.

These and other objects and advantages of the present invention will be more fully understood from the following detailed description of the invention taken together with the accompanying drawings.

DETAILED DESCRIPTION OF THE INVENTION

Figures 1, 1A:
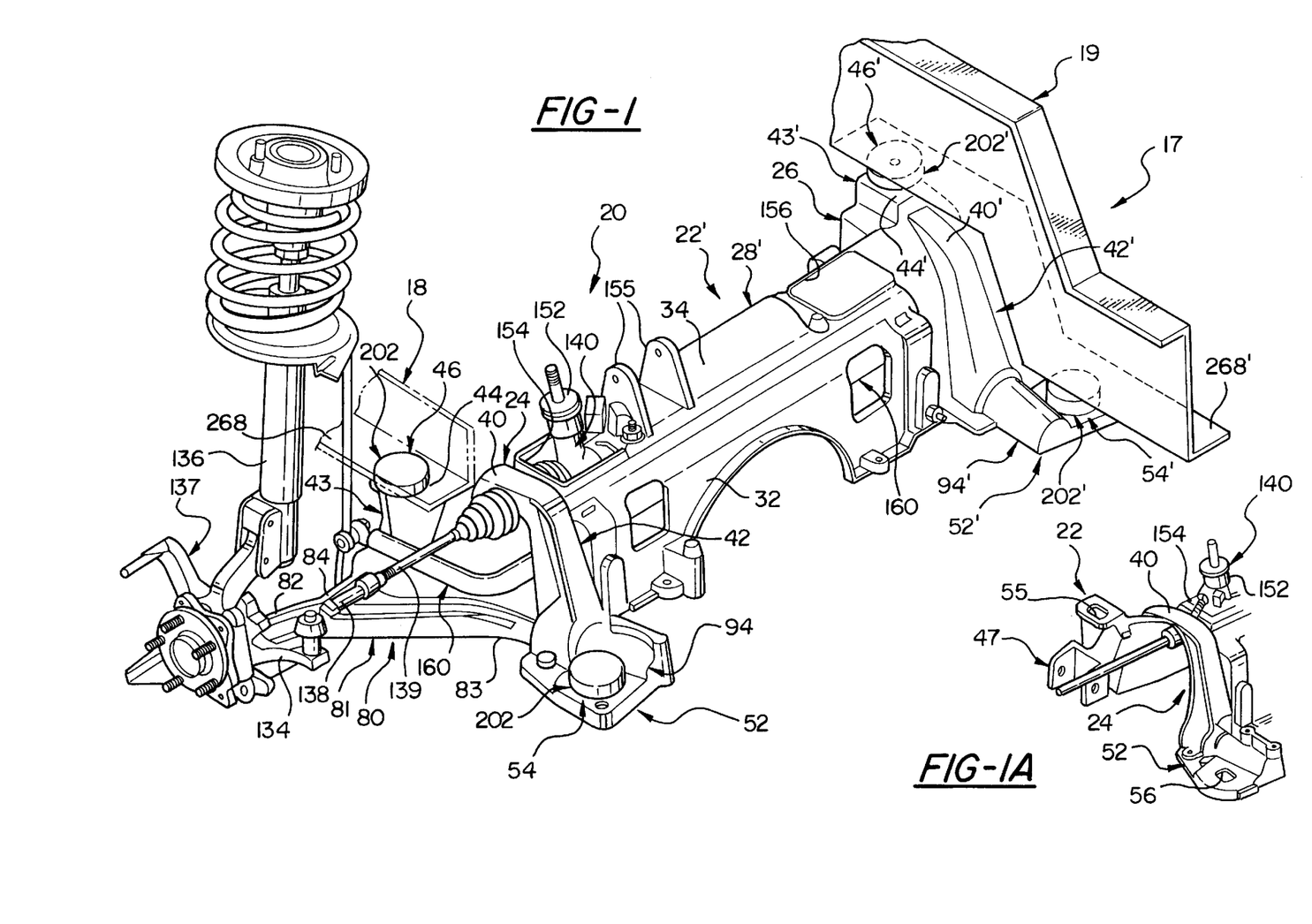
FIG. 1 is a fragmentary perspective view of a pair of vehicle body frame side rails supporting a sub-frame cradle of the present invention.
FIG. 1A is a fragmentary perspective view of the cradle left hand end arch with its suspension arm and isolator assemblies removed.
Figure 5:
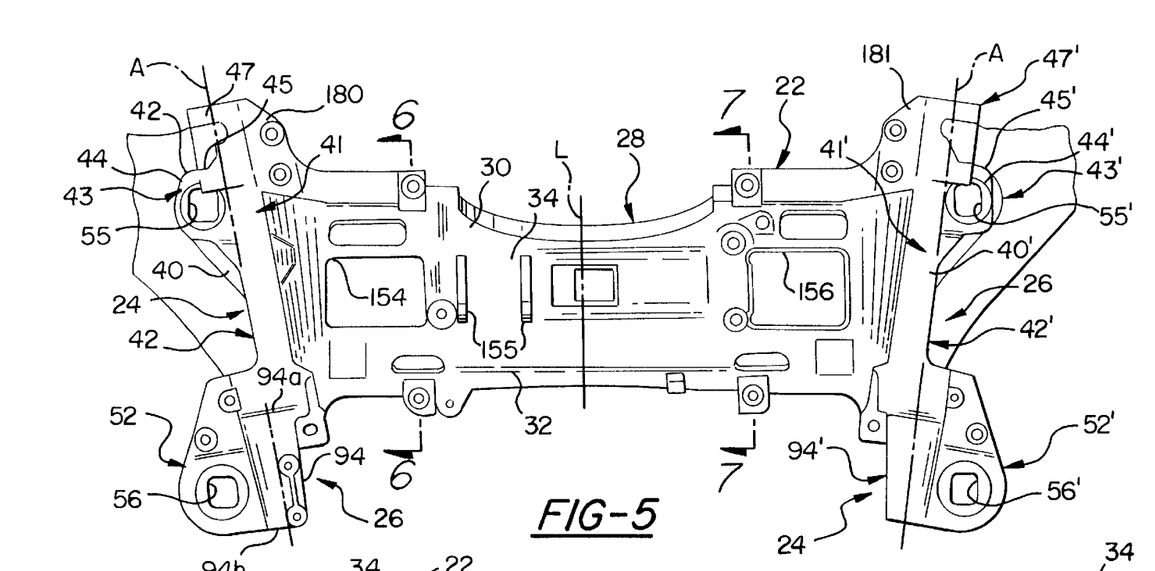
FIG. 5 is a detail top view of the mounting cradle of the present invention.
Figure 6:
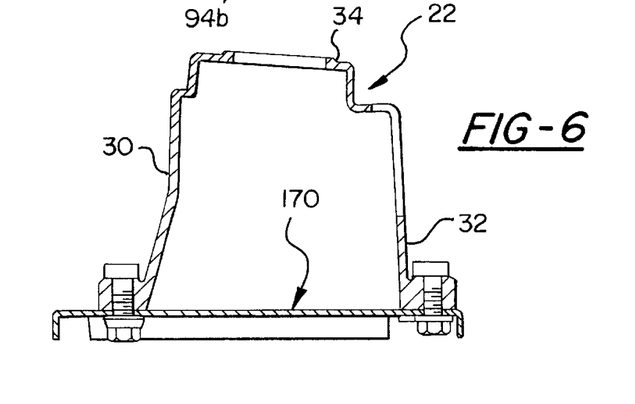
FIG. 6 is a vertical cross sectional view taken on the line 6—6 of FIG. 5.
Figure 7:
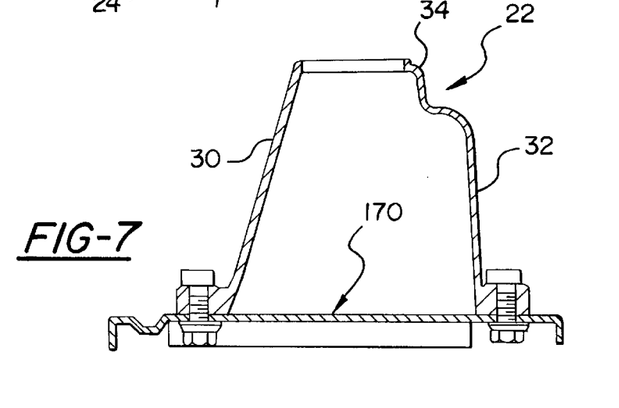
FIG. 7 is a vertical cross sectional view taken on the line 7—7 of FIG. 5.

Referring now to the drawings in detail, numeral 17 in FIG. 1 generally indicates a forward portion a front-wheel-drive or an all-wheel-drive vehicle body frame. The frame 17 comprises left 18 and right 19 frame side rail members on which a subframe cradle assembly, generally indicated at 20, is mounted in accordance with the present invention. A preferred form of the cradle assembly 20 is shown in FIG. 1 as a unitary or one-piece aluminum casted subframe cradle 22, comprising laterally spaced apart left side 24 and right side 26 outboard arches (FIG. 14) integrally joined by a transversely extending inverted generally U-section saddle.28. The cradle assembly 20 acts to shield the steering assembly from heat as foreign objects, such as stones. The cradle assembly 20 also shields the anti-sway bar bushings from catalytic converter heat. FIGS. 5–7 show the saddle 28 defined by front 30 and rear 32 downwardly extending saddle walls joined by a saddle top bight wall 34.

Figure 14:
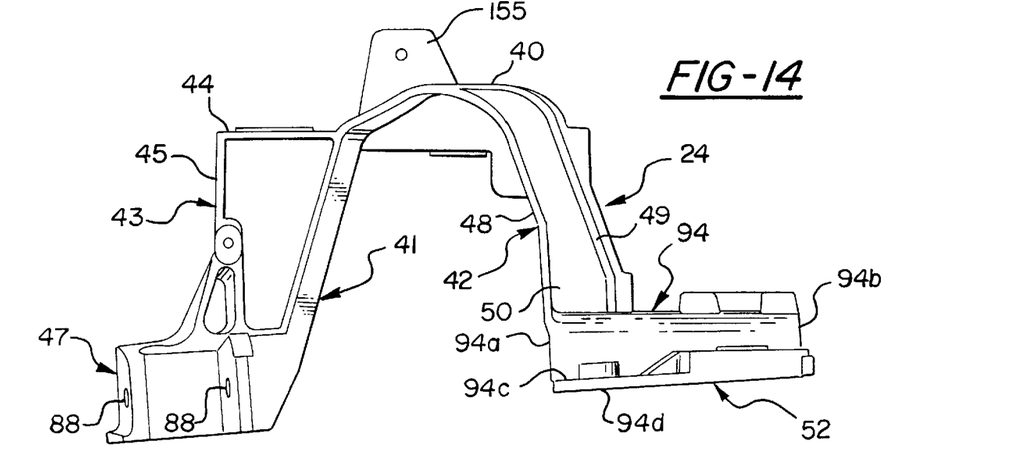
FIG. 14 is an enlarged left side view of the cradle of the present invention.
Figure 15:
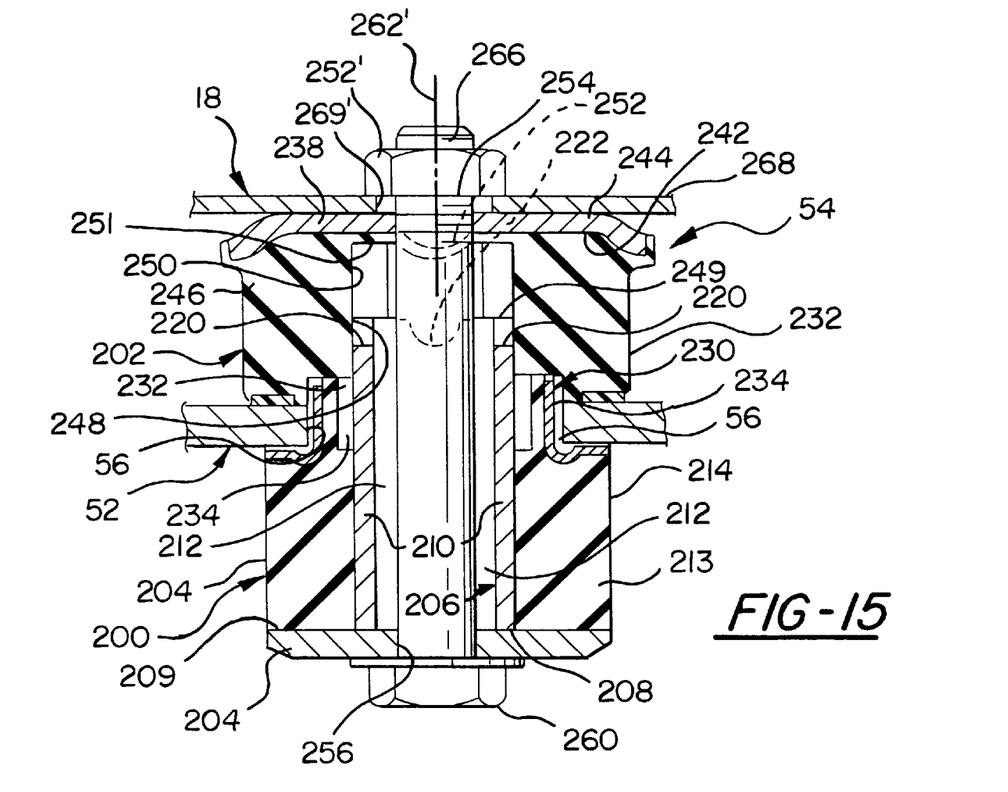
FIG. 15 is an enlarged fragmentary vertical cross sectional view of a vehicle body left rear isolator assembly, shown in its free state, taken on the line 15—15 of FIG. 4.
Figure 15A:
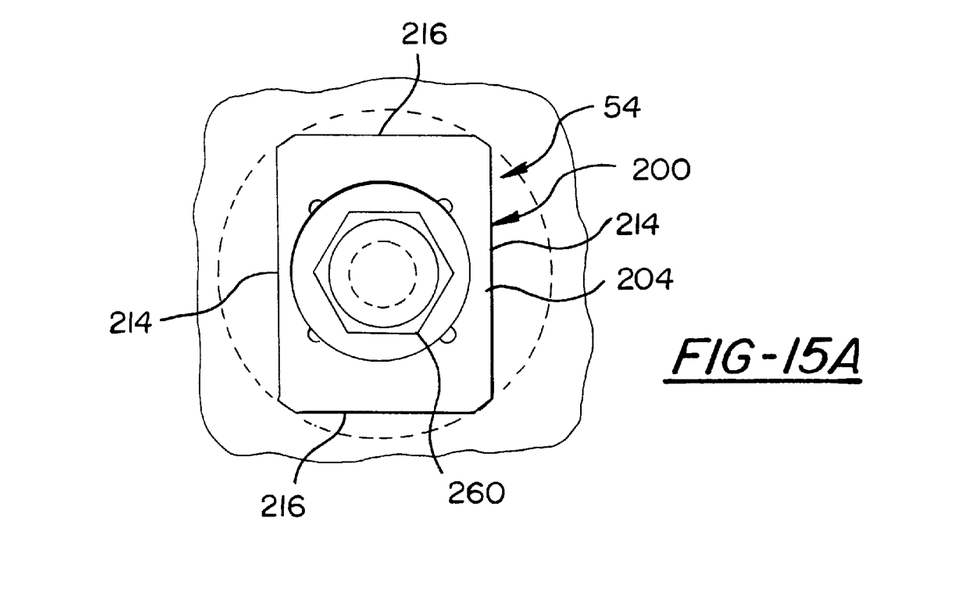
FIG. 15A is a fragmentary bottom view of the isolator mount of FIG. 15.

As seen in FIG. 14, the cradle left side arch 24 is defined by a top horizontal section 40 terminating at its fore and aft ends in downwardly diverging front 41 and rear 42 legs. The front leg 41 incorporates a body frame isolator mounting bracket 43, which includes a horizontal left front pedestal 44, supported by an upstanding bracket plate 45. In FIG. 1 the front bracket 43 is adapted to support a front isolator assembly, an isolator assembly is best shown in FIG. 15, for mounting to frame left rail member 18. The front leg 41 terminates at its lower distal end in a clevis fitting 47 for connection to a left hand lower suspension control arm front bushing.

FIG. 14 shows the left arch rear leg 42 cast in the form of an outwardly facing U-section channel consisting of front 48 and rear 49 side flanges, which extend laterally from a longitudinally disposed bight web 50. The flanges 48 and 49 converging upwardly to a juncture 51. The bight web 50 is joined to an associated end of the saddle rear wall 32. The left arch rear leg 42 terminates at its lower distal end in a footpad, generally indicated at 52, supporting a rear body isolator assembly 54 (FIG. 1) substantially identical to the front body isolator assembly 46. As seen in FIG. 5, the front pedestal 44 is machined with a front isolator assembly mounting aperture 55 while the rear footpad 52 has an identical rear isolator assembly mounting aperture 56.

Figure 3:
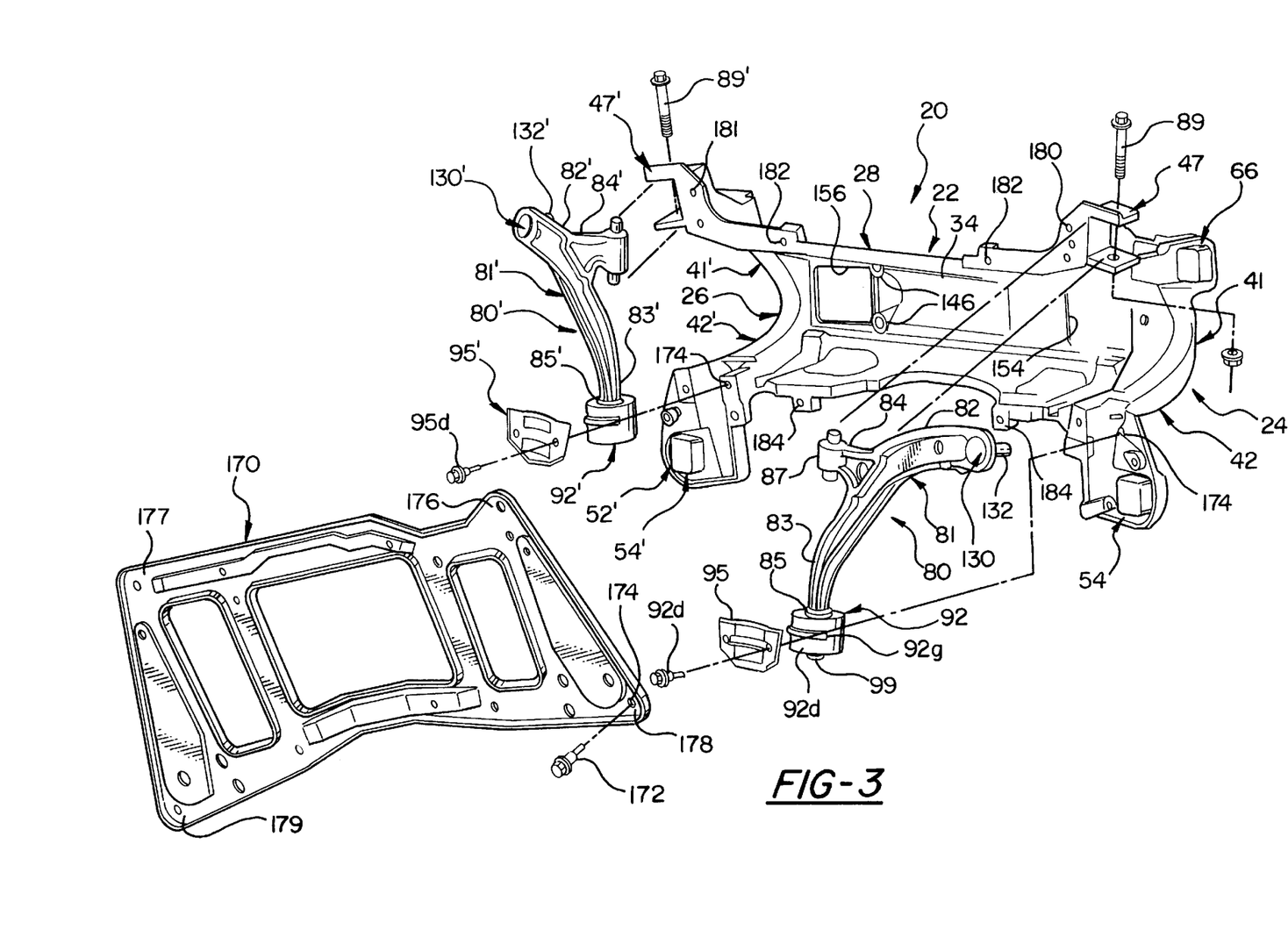
FIG. 3 is an exploded perspective view, similar to FIG. 2, showing the cradle with the rack and pinion steering assembly, lower control arms, and cradle plate removed.
Figure 4:
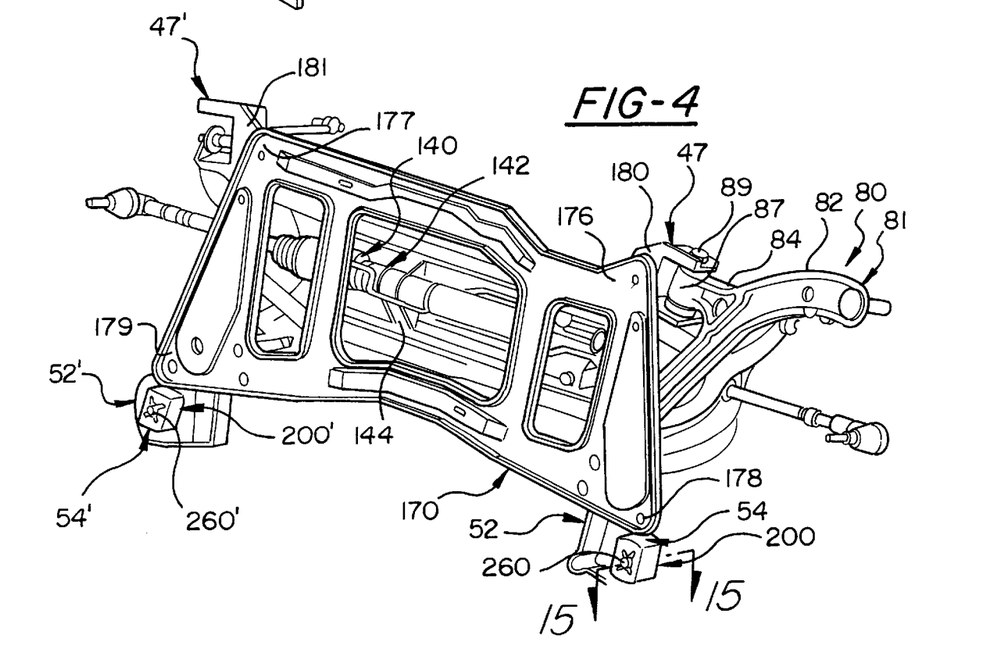
FIG. 4 is a perspective view, similar to FIG. 2, showing a cradle assembly adapted for installation in a vehicle.

With reference to FIGS. 1, 3, and 5, the cradle left 24 and right 26 pair of outboard side arches are generally symmetrical with each other about a longitudinally extending vehicle center axis indicated by dashed line "L" in FIG. 5. As the arches 24 and 26 are generally mirror images of each other, the same reference numerals will be used to described both the left and right side arches, with the exception that the right side arch numerals will be primed.

FIGS. 1 and 5 show the right side arch 26 including a top section 40' ending in downwardly diverging front 41' and rear 42' legs. The right front leg 41' is formed with an isolator mounting bracket 43', having a front pedestal 44' and an upstanding bracket plate 45', aas seen in FIG. 5. The pedestal 44' has an aperture 55' adapted to receive a right front isolator assembly 46', identical to left side isolator assembly 46. It will be seen in FIG. 5 that the leg 41' terminates at its lower end in a right hand front clevis fitting 47', while the rear leg 42' terminates in a footpad 52' formed with an aperture 56' for receiving a rear isolator assembly 54' (FIG. 3 ).

Figure 2:
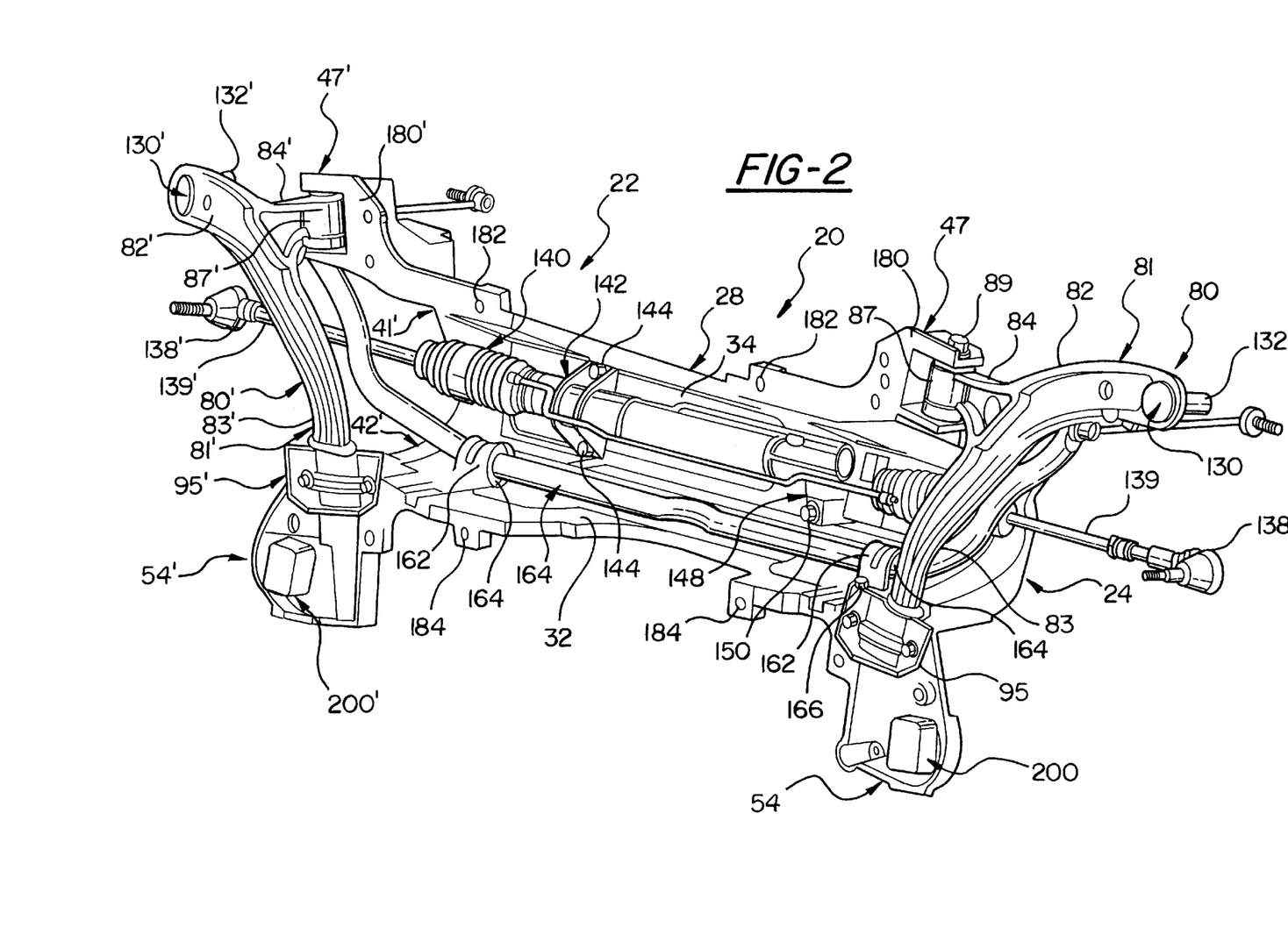
FIG. 2 is a perspective view of the underside of the mounting cradle of FIG. 1 prior to the attachment of a cradle bottom plate.

In FIGS. 2 and 3, numeral 80 generally indicates a left hand suspension lower control arm assembly of the vehicle while 80' depicts a right hand lower control arm assembly. In FIGS. 2 and 3, the front of the vehicle is toward the top of the drawing. As the left and right control arm assemblies are mirror images of each other, only the left arm assembly 80 will be described in detail. Similar or corresponding elements of the right hand control arm assembly 80' are identified by the same reference numerals as used to describe the left hand control arm assembly 80, except that the numerals are primed.

Figures 8, 9, 9A, 9B, 10, 11:
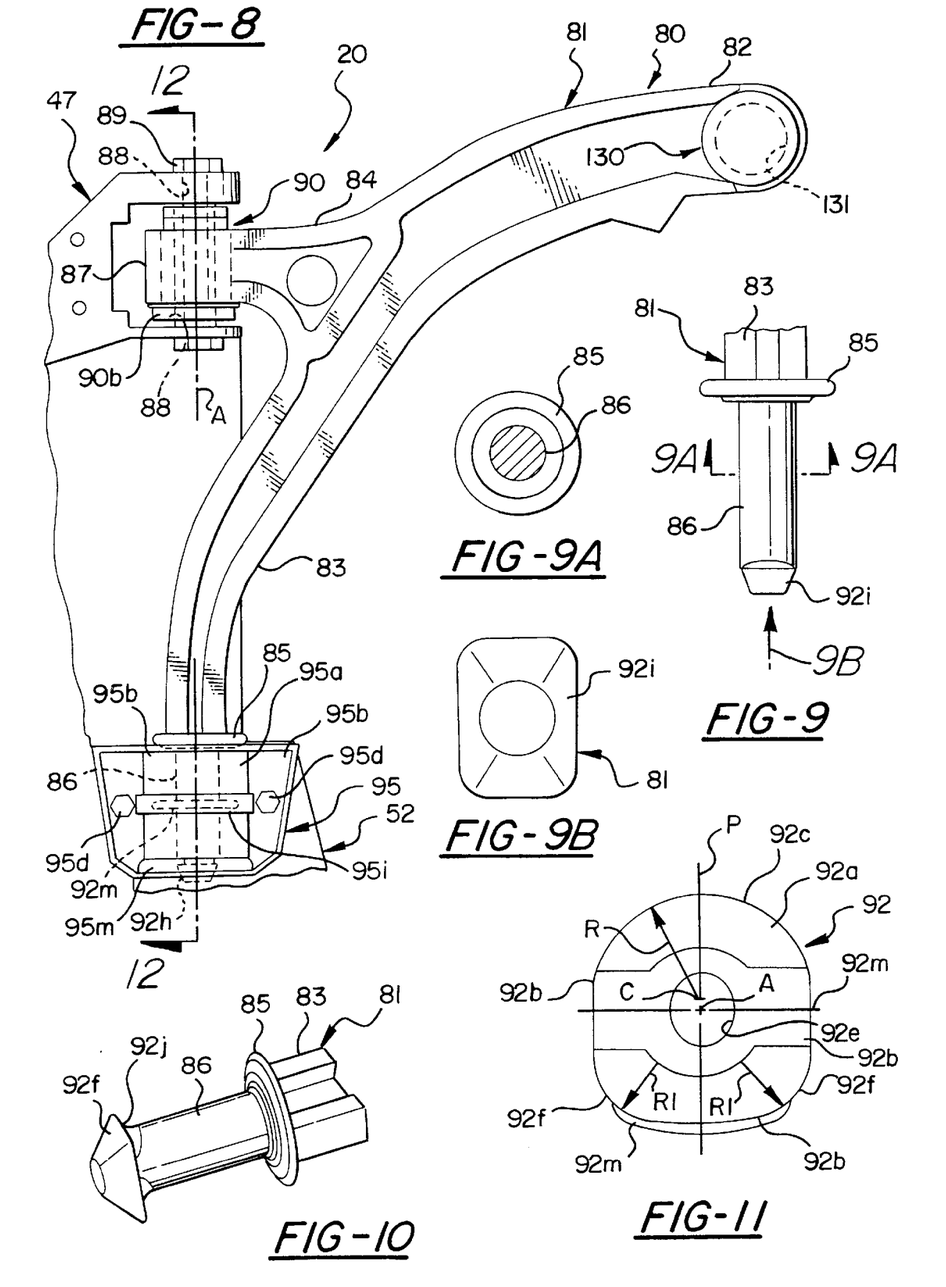
FIG. 8 is an enlarged fragmentary bottom view of the left hand suspension lower control arm of FIG. 1.
FIG. 9 is a detail enlarged fragmentary top view of the left hand suspension arm journal stem.
FIG. 9A is a vertical cross sectional view taken on the line 9A—9A of FIG. 9.
FIG. 9B is an enlarged end view taken in the direction of arrow "9B" in FIG. 9.
FIG. 10 is an enlarged fragmentary perspective view of the journal stem of FIG. 9.
FIG. 11 is an enlarged detail view of one end face of the rear pivot bushing.

The suspension lower control arm assembly 80, shown in FIGS. 1–3, includes a generally L-shaped one-piece arm or casting 81. The arm 81 includes a forward arm portion 82, adjacent to the front leg 41, and an aft arm portion 83 adjacent rear leg 42. FIG. 8 shows a control arm branch 84 extending transversely outboard from the front arm portion 82, while the rear arm portion 83 terminates in an annular collar 85, from which a rear bushing journal spindle or stem 86 extends rearwardly. It will be seen in FIGS. 2 and 8 that cradle left clevis fitting 47 is sized for reception of control arm integral loop 87 while clevis fitting aligned pair of axial bores 88 receive a pivot bolt 89. The clevis fitting bolt 89 is adapted for supporting a front pivot bushing assembly 90 (FIG. 12), press-fitted in control arm loop 87 for rotation about left side control arm swing axis "A".

Figure 12:
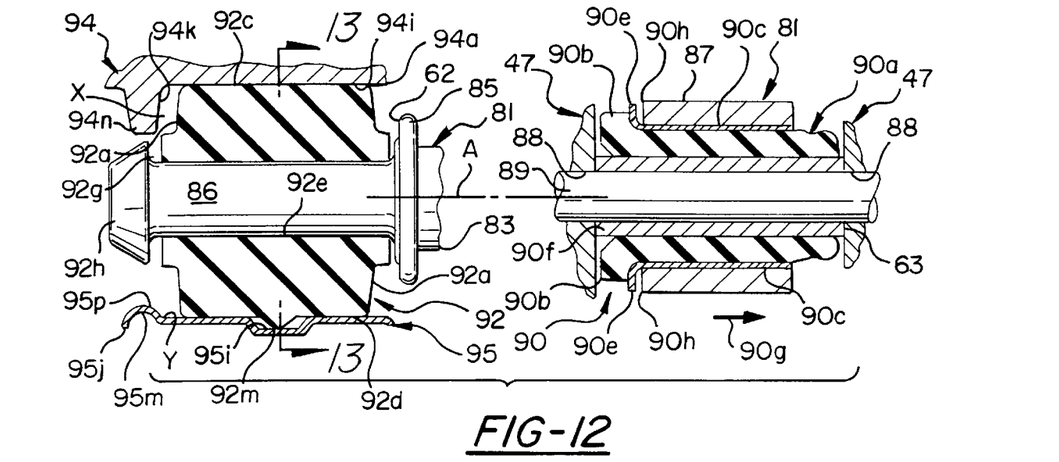
FIG. 12 is a fragmentary vertical cross sectional view, with parts broken away and partly in elevation, taken on the line 12—12 of FIG. 8.

Referring to FIG. 12, the front pivot bushing assembly 90 is a directional bushing and must be installed in the upper control arm loop 87 in a predetermined manner. FIG. 12 shows a cylindrical rubber bushing 90a having a pair of opposed rubber portions 90b. The pivot bushing assembly 90 comprises an outer metallic cylindrical sleeve 90c, press-fitted in suspension arm loop bore 90d by means of a radial flange 90e, and an inner split metallic sleeve 90f. Installing the front pivot bushing assembly 90 in the arm loop 87 requires special tooling for pushing or pulling on the outer sleeve radial flange 90e, in the direction of arrow 90g, FIG. 12, into the loop bore 90d.

Figure 13:
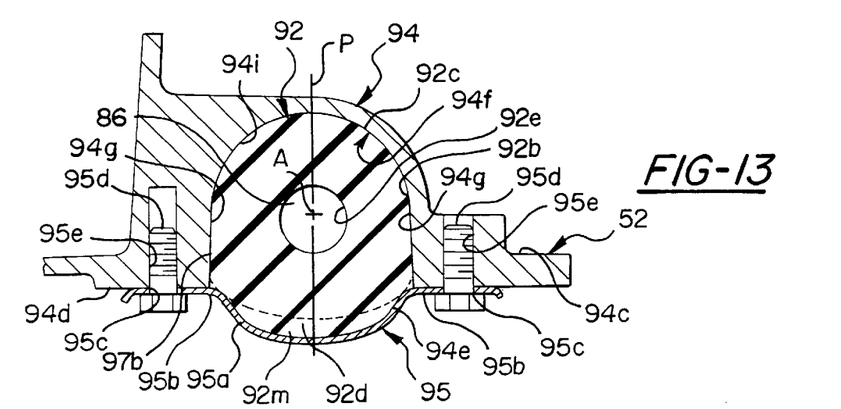
FIG. 13 is a fragmentary vertical cross sectional view taken on the line 13—13 of FIG. 12.

In FIGS. 11, 12, and 13, a rear pivot bushing 92, formed of rubber or other elastomeric material, is aligned on the axis "A". The rear bushing, which has identical end faces 92a, is shown in the detail view of FIG. 11 defining a generally oval-shape with opposite parallel flat sides 92b. It will be seen in FIG. 11 that the rear bushing has an upper half-round surface 92c, defined by a radius "R" having its center of curvature spaced slightly above the swing axis "A". Lower surface 92g (FIG. 8) of the rear bushing 92 has a slightly curved shape joined to its respective flat sides by rounded junctures 92f, each defined by a relatively small radius "R1".

The rear bushing of FIG. 11 has a central elliptical-shaped through passage 92e, aligned on the axis "A", adapted to be resiliently stretch-fitted on the control arm circular-section stem 86 (FIG. 9A). An installer stretches the rear bushing on the stem 86 by pushing and rocking the bushing until it is located in its design position on the stem, as seen in FIG. 12. It will be noted that with the bushing 92 in its FIG. 12 design position, one end face 92a is axially spaced from opposed shoulder 92g, as best seen in FIG. 8, of frusto-conical shaped nub 92h formed on the distal free end of the stem. The rear bushing front face 92a is shown axially spaced from opposed rear annular face 62 of stem collar 85. The rear bushing lower surface 92d is formed at its axial midpoint with a raised, transversely extending, rib 92m which, as viewed in FIG. 12, has a semi-circular cross section.

With reference to FIGS. 13 and 14, a rear bushing housing 94 is integrally cast with the left side arch rear footpad 52 while a substantially mirror image housing 94' is similarly cast with the right side arch rear footpad 52', as depicted in FIG. 1. The housing 94, which has an open front end 94a and a closed aft end 94b (FIG. 14), is shown upstanding from upper surface 94c of the cradle rear footpad 52. It will be seen in FIG. 13 that housing undersurface 94d is provided with an access opening 94e of a housing rear bushing cavity, generally indicated at 94f. The cavity 94f, which is defined by a pair of opposed internal parallel sides 94g extending vertically from the access opening 94e, terminates in a half-round ceiling 94i.

Referring to FIG. 8, a rear bushing retainer 95, having a generally trapezoidal shape in plan, includes a central concavo-convex body 95a which conforms to the lower surface of the rear bushing 92. FIG. 13 shows the retainer 95, which is symmetrical about a vertically disposed plane that includes axis "A". Retainer 95 is formed with a pair of side attaching flanges 95b adapted for flush mating with the housing underside 94d. Each side flange 95b has a mounting hole 95c for threaded reception of a machine bolt 95d in an associated aligned housing bore 95e.

As seen in FIG. 12, the rear pivot bushing lower surface transverse raised rib 92m is adapted for capture in a transverse trough-section groove 95i formed in the retainer body 95a. It will be seen in FIG. 12 that retainer aft edge 95j is defined by a radiused upwardly convex or half-round ridge 95m defining a stop surface 95p axially spaced from bushing rear end face 92a, defining a predetermined axial lower clearance gap "Y". Further, the cavity ceiling 94i has a downwardly projecting transversely extending blocking rail 94n providing a stop face 94k axially spaced from bushing end face 92a defining a predetermined axial upper clarence gap "X". The rail stop face 94k is adapted, together with the ridge stop surface 95, to contact the bushing opposed rear end face 92a to thereby establish upper "X" and lower "Y" clearance gaps designed to permit axial positioning of the rear bushing 95 and stem 86 within liberal tolerance limits on the axis "A". The effect of providing clearance gaps "X" and "Y" insures tight tolerance positioning of the front bushing 90, which locates a suspension arm balljoint 130, (FIG. 8) to its associated body frame side tail 81.

Figure 18:
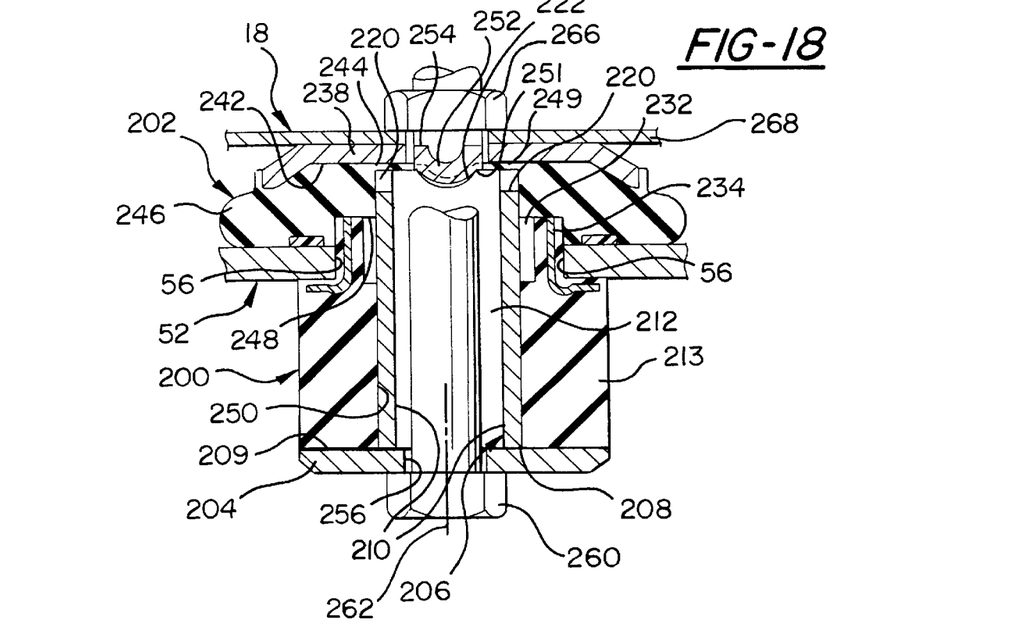
FIG. 18 is a view similar to FIG. 15 showing the isolator assembly in its compressed state.

It will be noted in FIGS. 13 and 18 that with the rear bushing upper portion being received in the housing cavity 94f, and the bolts 95d threaded in their associated bores 95e the rear bushing is trapped between the cavity and the retainer 95. The rear bushing is molded of a predetermined size relative to the cavity whereby upon the bolts 95d being torqued down the rear bushing is subjected to a pre-compression load resulting from the retainer side flanges 95b being urged into flush contact with the housing undersurface 94d. The mounting arrangement for the lower control arm 80, which swings about the axis "A", provides a support arrangement wherein changes in the geometrical load pattern of the front suspension during vehicle travel is minimized.

FIG. 8 shows the left hand control arm 81 having its front arm portion 82 terminating in the balljoint 130 pressed into a seated position in an arm bore 131. The balljoint 130 has an upstanding stud 132 (FIG. 3), adapted for pivotal connection to its associated steering knuckle arm, shown at 134 in FIG. 1.

Referring to FIG. 2, the rack and pinion steering assembly 140 is shown mounted to an underside of the cradle bight wall 34 by a semi-circular right hand bracket 142, secured by a pair of bolts 144 to associated cradle integral threaded bosses, shown at 146 in FIG. 3. In FIG. 2 a second left hand bracket 148 mounts the steering assembly 140 to the cradle bight wall underside by bolt 150.

A steering assembly control valve, shown at 152 in FIG. 1, extends upwardly through a left hand rectangular aperture 154 provided in the cradle bight wall 34, intermediate the cradle left hand arch upper section 40 and a pair of laterally spaced apart upstanding engine mounting bracket flanges 155. It will be noted that a right hand rectangular aperture 156 is also provided in the bight wall 34 for accommodating a control valve of an optional right hand steering assembly. The steering assembly 140 is thus packaged in a space efficient, compact nested manner on the cradle thus avoiding interference with other vehicle components.

With reference to FIGS. 1 and 2, it will be seen that a front stabilizer bar assembly 160 is also mounted on the underside of the saddle bight wall 34 by means of a pair of annular bar brackets 162. The brackets 162, shown encircling associated elastomer isolator bushings 164, are secured to the cradle by bolts 166 (shown only with respect to bracket 162 on the right side of FIG. 2). By virtue of the steering assembly 140 and stabilizer bar assembly 160 being retained on the underside of the cradle bight wall, the cradle forward 30 and aft 32 side walls, together with a cradle base plate 170 to be described below, shield the assemblies 140 and 160 from engine catalytic converter heat and direct stone impingement.

As seen in FIG. 3, a generally trapezoid-shaped cradle plate is shown at 170 adapted for mounting on the underside of the cradle by a plurality of bolts 172 received in corresponding cradle bores 174. The cradle plate 170 has a pair of front corner portions 176 and 177 and a pair of rear corner portions 178 and 179 provided with associated bolt holes. The pair of front clevis fittings 47 and 47' each include respective integral pad portions 180 and 181 adapted for flush bolted attachment of a corresponding pair of cradle plate front corner portions 176 and 177. In a like manner, the pair of rear footpads 52 and 52' are each adapted for flush bolted attachment of their corresponding pair of cradle plate rear corner portions 178 and 179. It will be appreciated that upon attachment of the cradle plate 170, each of the cradle left side 24 and right side 26 arches each have associated front leg clevis fitting integral pad portions 180 and 180' and associated rear leg footpads 52 and 52' fixedly attached to the cradle plate 170 to provide a unitary subframe cradle structure. In addition, as seen in FIG. 3, the cradle transverse saddle front 30 and rear 32 walls have their lower distal ends formed with respective pairs of integral front 182 and rear 184 flange portions for bolted attachment to the cradle plate 170 to further unify the cradle and plate structure.

Referring to FIG. 1, the cradle assembly 20 is mounted at four points on the vehicle body frame 17, by two front isolator assemblies 46 and 46' and two rear isolator assemblies 54 and 54' with all four assemblies being substantially identical. In the description of the left rear isolator assembly 54 that follows, it will thus be understood that such description applies to the remaining three cradle isolator assemblies 46, 46', and 54'.

Figures 16, 17:
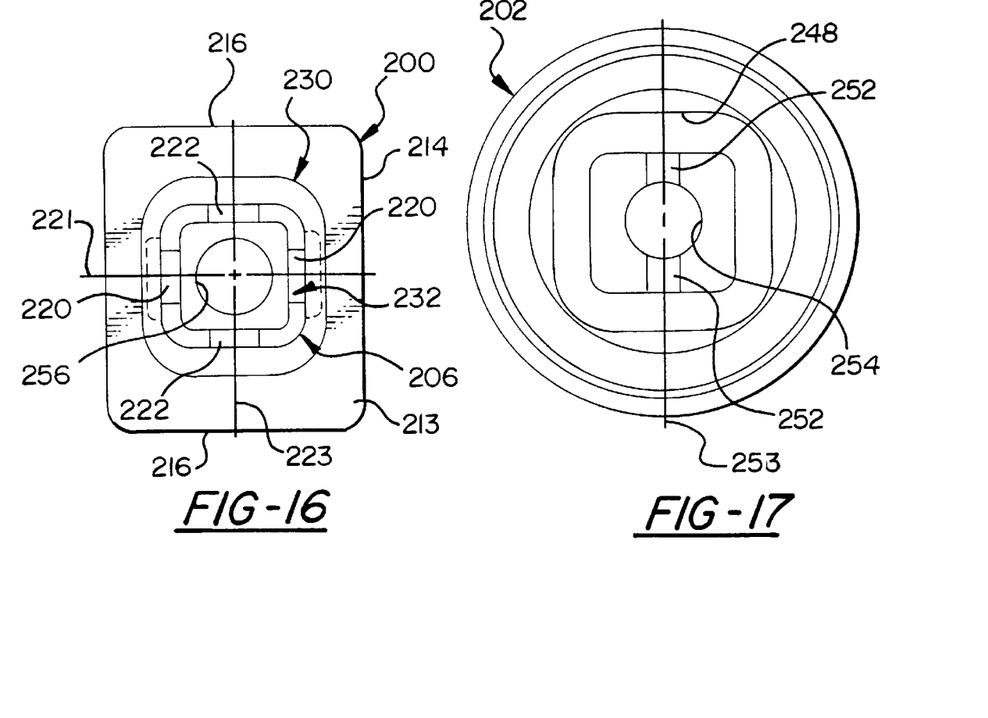
FIG. 16 is a detail top view the lower block-shaped cushion mount of the isolator assembly of FIG. 15.
FIG. 17 is a detail bottom view of the upper disc-shaped cushion mount of the isolator assembly of FIG. 15.

The left rear isolator assembly 54, shown in FIG. 15, includes a lower block-shaped cushion unit or mount 200 and an upper disc-shaped cushion unit or mount 202. The lower cushion mount 200 includes a lower metal base plate 204 supporting an upstanding square-sectioned central inner pillar 206 having its lower end 208 fixed, as by welding, to inner surface 209 of the base plate 204. FIG. 15 shows the pillar 206 including a pair of identical front and rear wall portions 210—210 and a pair of identical side wall portions 212—212 each bonded to a surrounding generally rectangular-shaped block member 213 of elastomer material such as rubber, defined by opposite parallel sides 214 and ends 216 (FIG. 16 ). The identical side wall portions 212—212 each terminate at an upper end with a first cutout 222, which is aligned on the horizontal axis labeled by reference number 223 (FIG. 16). The front and rear portions 210—210 each terminate at an upper end with a second cutout 220. The second cutout 220 is similar in nature to the first cutout 222 shown in FIG. 15. The cutout 220 is aligned on the horizontal axis labeled by the reference numeral 221. A detailed top view of the lower blocked shaped cushion mount 200 is shown in FIG. 16.

The lower cushion mount block 213 terminates at its upper end in an upstanding square-section metal collar 230 having its outer and inner faces bonded to conforming layers of elastomeric material. The collar 230 has a predetermined size for snug press-fit reception in its associated rectangular-shaped rear lower mount opening 56 in footpad 52. It will be seen in FIG. 16 that a pair of opposite voids 232 are provided between a pair of front and rear wall portions 210—210 and their associated collar upstanding side flanges 234.

The upper cushion mount 202 has an annular cap 238 with its underside 242 bonded to upper surface 244 of upper mount elastomer disc member 246. Each of the four lower cushion mounts 200 has its collar 230 press-fitted into an associated cradle opening 55, 55', 56, and 56' prior to the shipment of the cradle 22 to the vehicle final assembly. At the final assembly, an upper isolator mount 202, formed with a rectangular recess 248 in its underside (FIG. 17 ), is fitted on an upper protruding end of an associated lower mount collar 230. At the same time, upper end 249 of lower mount pillar 206 is snugly telescopically received in a square-section axial blind passage 250 formed in underside recess 248 of the elastomer disc 246.

It is seen in FIG. 15 that the passage 250 upper blind end is closed by a central portion 251 of the upper cap 238. The cap is stamped with a generally semi-circular section depressed key 252, aligned on horizontal axis 253, projecting downwardly on either side of an axial bolt hole 254 in the upper cap 238 (FIG. 17 ). The cap bolt hole 254 is aligned with a lower mount bolt hole 256 in lower mount base plate 204, with the bolt holes 254 and 256 shown receiving an isolator assembly securing bolt 260 aligned on isolator vertical axis 262. As viewed in FIG. 1B, upon the four upper cushion mounts, such as the right front and right rear cushion mounts 202', being fitted on their associated lower mounts, respective isolator assembly bolts 260' are adapted for insertion from below. In its free state, the left rear isolator assembly of FIG. 15 is shown with bolt 260 received in its associated cushion mount holes 256 and 254 and threaded into an aligned nut 266, welded to an upper surface of lower rail flange 268 of frame side rail 18. An oversize bolt hole 269 is provided in the flange 268 aligned with each weld nut threaded bore axis. It will be noted that after the cradle arches 24 and 26 are located on the underside of their associated frame side rails 18 and 19, the attachment bolts 260 are inserted from below through each lower mount 200 and its associated upper mount 202 and threaded into an aligned weldnut, such as weldnut 266 on side rail flange 268. Upon each bolt being tightened, its associated upper 202 and lower 200 mounts are compressed, as seen in FIG. 18.

Figure 1B:
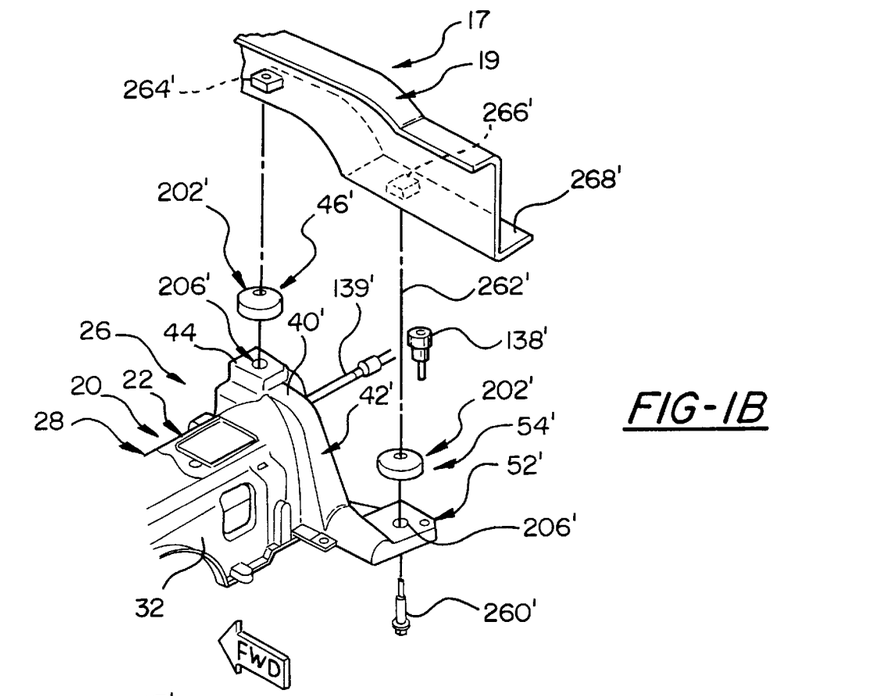
FIG. 1B is fragmentary, exploded, perspective view of the cradle right end arch, associated front and rear isolator upper mounts, and right hand frame side rail member.

Referring to FIG. 1B, a cradle right side arch 26 is shown secured to lower flange 268' of the right side frame rail 19 by the right front 46' and rear 54' isolator assemblies. FIG. 1 shows the cradle left side arch 46 secured to the lower flange 268 of the left side frame rail 18 by the left front 46 and rear 54 isolator assemblies. It will be appreciated that each right upper disc-shaped cushion mount 202' is readily oriented on its associated lower cushion mount pillar by being rotated to one of four ninety degree positions.

With reference to FIG. 15, it will be seen that at any of four ninety degree positions of the upper cushion mount 202 one of the pillar opposed side 220 or end 222 pair of half-round keyway-like cutouts will be aligned to mate with the downwardly projecting key 252. As discussed above, during vehicle final assembly, upon each of the isolator assembly bolts being tightened, its associated upper mount elastomer disc 246 is compressed, as shown in FIG. 18, causing the lower mount pillar upper end 249 to telescope further into the passage 250 and contact its blind end 251. As a result, the key 252 is received in the pillar opposed half-round cutouts 222, thereby positively interlocking the upper 202 and lower 200 cushion mounts together obviating relative rotation therebetween.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A cradle assembly for a motor vehicle having a frame and a steering assembly, the cradle assembly comprising:

a transversely extending saddle having a generally U-shaped cross section, said saddle including an upper wall and front and rear downstanding walls, said saddle at least partially defining a transversely extending cavity for receiving the steering assembly; and  a transversely extending plate attached to said front and rear downwardly extending walls, said plate cooperating with said front and rear downwardly extending walls and said upper wall to define an at least partially enclosed area;

wherein said upper wall includes a first aperture for accommodating a steering valve of said steering assembly when said steering assembly is a left hand steering assembly and a second aperture for accommodating said steering valve when said steering assembly is a right hand steering assembly.

2. The cradle assembly for a motor vehicle of claim 1, wherein said saddle is a one-piece casting.

3. The cradle assembly for a motor vehicle of claim 1, further comprising a mounting bracket for securing the steering assembly to an underside of said saddle.

4. The cradle assembly for a motor vehicle of claim 1, further comprising an engine mounting bracket upwardly extending from said upper wall of said saddle.

5. A cradle assembly for a motor vehicle having a frame and a steering assembly, the cradle assembly comprising:

a transversely extending saddle having a generally U-shaped cross section, said saddle including an upper wall and front and rear downstanding walls, said saddle at least partially defining a transversely extending cavity for receiving the steering assembly, said upper wall including a first aperture for accommodating a steering valve of said steering assembly when said steering assembly is a left hand steering assembly and a second aperture for accommodating said steering valve when said steering assembly is a right hand steering assembly.

6. The cradle assembly for a motor vehicle of claim 5, wherein said saddle is a one-piece casting.

7. The cradle assembly for a motor vehicle of claim 5, further comprising a mounting bracket for securing the steering assembly to an underside of said saddle.

8. The cradle assembly for a motor vehicle of claim 5, further comprising an engine mounting bracket upwardly extending from said upper wall of said saddle.

9. The cradle assembly for a motor vehicle of claim 5, further comprising a transversely extending plate attached to said front and rear downwardly extending walls, said plate cooperating with said front and rear downwardly extending walls and said upper wall to define an at least partially enclosed area.

10. A cradle assembly for a motor vehicle having a frame and a steering assembly, the cradle assembly comprising:

a transversely extending saddle having a generally U-shaped cross section, said saddle including an upper wall and front and rear downstanding walls, said saddle at least partially defining a transversely extending cavity for receiving the steering assembly; and a transversely extending plate attached to said front and rear downwardly extending walls, said plate cooperating with said front and rear downwardly extending walls and said upper wall to define an at least partially enclosed area, said transversely extending plate transversely extending substantially the entire length of said transversely extending saddle.

11. The cradle assembly for a motor vehicle of claim 10, wherein said saddle is a one-piece casting.

12. The cradle assembly for a motor vehicle of claim 10, further comprising a mounting bracket for securing the steering assembly to an underside of said saddle.

13. The cradle assembly for a motor vehicle of claim 10, further comprising an engine mounting bracket upwardly extending from said upper wall of said saddle.

14. The cradle assembly for a motor vehicle of claim 10, said upper wall includes at least one aperture providing access to said steering assembly.

15. The cradle assembly for a motor vehicle of claim 10, wherein said upper wall includes a first aperture for accommodating a steering valve of said steering assembly when said steering assembly is a left hand steering assembly and a second aperture for accommodating said steering valve when said steering assembly is a right hand steering assembly.

16. The cradle assembly for a motor vehicle of claim 10, wherein said transversely extending plate includes a pair of front corner portions and a pair of rear corner portions each secured to an underside of said saddle.

17. The cradle assembly for a motor vehicle of claim 10, wherein said saddle includes a left side arch downwardly terminating at a first pair of feet and a right side arch downwardly terminating at a second pair of feet, said transversely extending plate secured to each foot of said first and second pair of feet.

* * * * *